No. 612,103. Patented Oct. 11, 1898.
J. A. HEANY.
WHEEL FOR VEHICLES.
(Application filed Mar. 5, 1898.)
(No Model.)
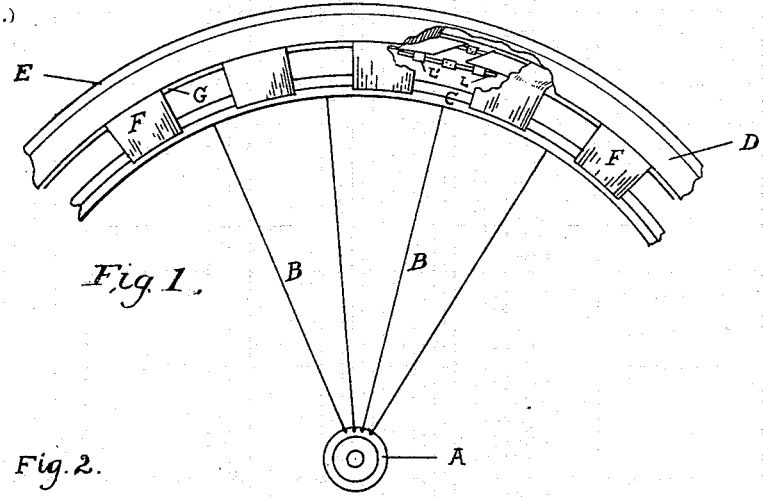
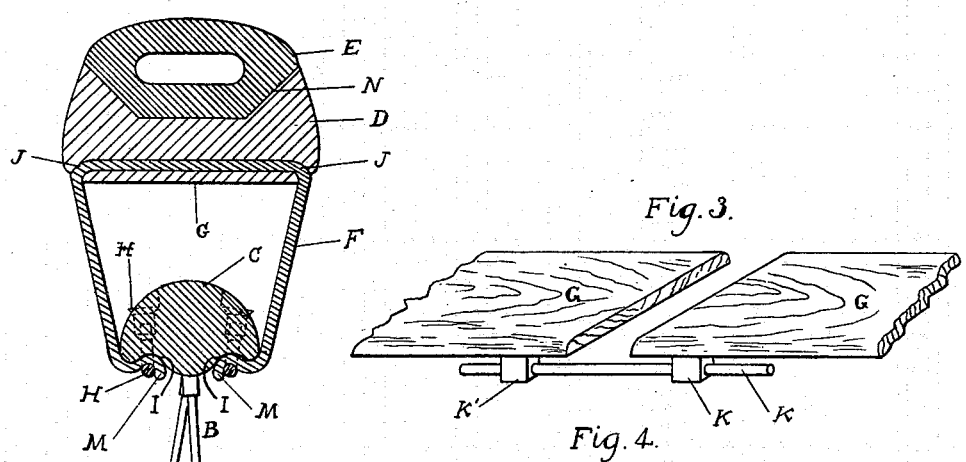
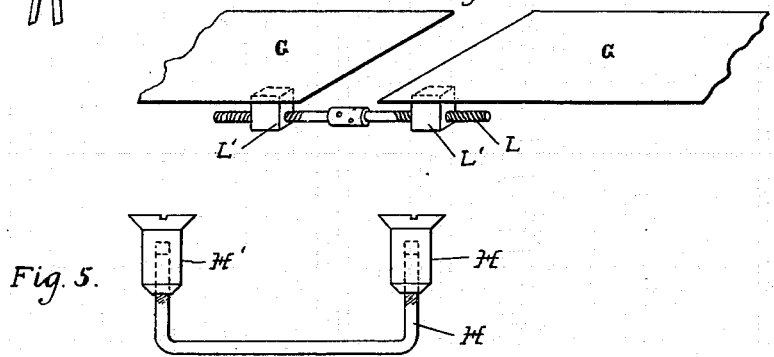
WITNESSES:
INVENTOR
John Allen Heany
BY
George E. Buckley
ATTORNEY.

UNITED STATES PATENT OFFICE.

JOHN ALLEN HEANY, OF PHILADELPHIA, PENNSYLVANIA.

WHEEL FOR VEHICLES.

SPECIFICATION forming part of Letters Patent No. 612,103, dated October 11, 1898.

Application filed March 5, 1898. Serial No. 672,759. (No model.)

*To all whom it may concern:*

Be it known that I, JOHN ALLEN HEANY, a citizen of the United States, and a resident of Philadelphia, Pennsylvania, have made certain Improvements in Wheels for Vehicles, of which the following is a description, reference being had to the annexed drawings, making part hereof.

The nature and object of my invention will appear from the following specification and claims.

In the drawings, Figure 1 is an elevation of one section of a wheel, showing the hub, spokes, stiff inner rim, stiff felly, rubber tire, and the elastic rubber bands securing the rim and felly together; Fig. 2, a cross-sectional view of the rim, felly, hollow rubber tire, and one of the rubber bands for securing the rim and felly together, and the clamp-hoop; Fig. 3, a broken elevation of a short section of the spring clamp-hoop, showing the two contiguous ends thereof held in position by an ordinary bolt and staples; Fig. 4, a view similar to that shown in Fig. 3, excepting that instead of the bolt a right-and-left screw is shown for throwing the ends of the clamp-hoop apart; Fig. 5, a bent U-shaped wire clamp screw-threaded at its ends and secured by correspondingly female screw-threaded tubes, forming two ordinary bicycle-screws.

A is the hub; B, the spokes; C, the inner rim; D, the felly; E, the rubber tire, which is in Fig. 2 shown to be simply a hollow rubber tube, not necessarily pneumatic; F F, a series of open rubber bands upon which I depend to secure the desired resiliency of my wheel; G, a bent light wooden or metallic hoop adapted to set in groove J, sunk in the inner face of felly D. This hoop is open, and I so set its curve that it springs into said groove J, holding bands F between it and the felly. The two open ends of hoop G are joined by bolt K and staples K' or by right and left screw-threaded clamp L and its screw-threaded staples L'. This clamp will serve to force the ends of the hoop apart and bind said hoop firmly in place in the groove J. Each band F is provided at its ends with enlargements M M.

I I are continuous grooves in the inner face of the rim C.

N is a groove in the outer face of felly D, into which endless rubber tire E is sprung.

In constructing my machine the bands F F (having due regard to proper spacing around the periphery of the rim) are first fastened by their ends by looped or U-shaped clamps H H' in the two grooves I I, as shown in Figs. 1 and 2. The open hoop G is now worked into what are now the loops F F throughout the whole series of the latter and the loop is then sprung into groove J in the inner face of the felly, and to secure it there and retain it in place the right-and-left screw-bar L is set in its staples L', and this bar is so turned as to tend to force the adjacent ends of the hoop apart and so secure it from being shifted by any slight motion caused by the revolution of the wheel and the consequent slight spring of the felly.

If desired, the process of construction may be reversed—viz., the bands may be spaced and secured between the hoop G and felly D first and then be secured to the rim C by clamps H H', as shown. It will be observed that the sides of the depression in felly D, which form groove J, simply serve to hold hoop G against lateral deflection. It will be observed that the ends of clamps H H' set through inner rim C to bind bands F F to the latter. To any mechanic skilled in this art it will be apparent that the bands F when in place must be set so as to be under tension and that the tension of each band of the series must be, as nearly as possible, the same as that of its neighbors.

What I claim as new is—

1. In a wheel for vehicles, the combination of hub A; spokes B; rim C; felly D, provided with groove J, the said rim and felly being separated by an open space; a series of double-ended rubber bands F F; open hoop G, sprung into said groove J; loop-clamps H H', setting through rim C and over bands F F to bind the latter to said rim C, substantially as and for the purposes described.

2. In a wheel for vehicles, the combination of hub A; spokes B; rim C, provided with inner grooves I I; felly D, provided with groove J, the said rim and felly being separated by an open space; a series of double-ended rubber bands F F; open hoop G, sprung into said groove J; loop-clamps H H', setting through rim C and engaging over bands F F, inside the ends thereof and binding the latter to the inner face of rim C, substantially as described.

3. In a wheel for vehicles, the combination of hub A; spokes B; rim C; felly D, provided with groove J, the said rim and felly being separated by an open space; a series of open, or double-ended rubber bands F F; open hoop G, sprung into said groove J and its open ends being united for the purpose of spreading them by right and left handed screw L L'; loop-clamps H H', setting through rim C and over bands F F, to bind the latter to said rim C, substantially as described.

JOHN ALLEN HEANY.

Witnesses:
 WM. R. HELLYER,
 ANDREW BROGAN.